United States Patent
Fender et al.

(10) Patent No.: US 11,455,303 B2
(45) Date of Patent: Sep. 27, 2022

(54) DRIVING MASSIVE SCALE OUT THROUGH REWRITES OF ANALYTICAL FUNCTIONS

(71) Applicant: Oracle International Corporation, Redwood Shores, CA (US)

(72) Inventors: Pit Fender, Union City, CA (US); Benjamin Schlegel, Merced, CA (US); Matthias Brantner, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 329 days.

(21) Appl. No.: 16/516,898

(22) Filed: Jul. 19, 2019

(65) Prior Publication Data

US 2021/0019315 A1 Jan. 21, 2021

(51) Int. Cl.
*G06F 16/245* (2019.01)
*G06F 16/2453* (2019.01)
*G06F 16/2455* (2019.01)

(52) U.S. Cl.
CPC .... *G06F 16/24535* (2019.01); *G06F 16/2456* (2019.01); *G06F 16/24537* (2019.01); *G06F 16/24539* (2019.01); *G06F 16/24556* (2019.01)

(58) Field of Classification Search
None
See application file for complete search history.

(56) References Cited

U.S. PATENT DOCUMENTS

| | | | | |
|---|---|---|---|---|
| 6,061,676 A * | 5/2000 | Srivastava | ....... | G06F 16/24537 707/999.005 |
| 7,577,667 B2 * | 8/2009 | Hinshaw | ............ | G06F 16/2455 |
| 2004/0133568 A1 * | 7/2004 | Witkowski | ........... | G06F 16/244 |
| 2004/0220911 A1 * | 11/2004 | Zuzarte | ............ | G06F 16/90335 |
| 2008/0033914 A1 * | 2/2008 | Cherniack | ............ | G06F 16/283 |
| 2010/0088315 A1 * | 4/2010 | Netz | ..................... | G06F 16/221 707/737 |
| 2011/0313999 A1 * | 12/2011 | Bruno | ............... | G06F 16/24542 707/718 |
| 2015/0149436 A1 * | 5/2015 | McKenna | .......... | G06F 16/2453 707/714 |
| 2018/0018375 A1 * | 1/2018 | Brunel | .................. | G06F 16/221 |
| 2019/0251196 A1 * | 8/2019 | Goyal | ............... | G06F 16/24535 |

OTHER PUBLICATIONS

Babu, "Adaptive Query Processing in Data Stream Management Systems", 2005, all pages. (Year: 2005).*

* cited by examiner

*Primary Examiner* — Son T Hoang
(74) *Attorney, Agent, or Firm* — Hickman Becker Bingham Ledesma LLP

(57) ABSTRACT

According to an embodiment, a method includes rewriting a particular query to generate a rewritten query. The particular query specifies a window function operator, a particular input to the window function operator, and an analytical function. Rewriting the particular query includes assigning the particular input to an intermediate relation and replacing the window function operator with a replacement operator. The method further includes assigning to the replacement operator an aggregate function corresponding to the analytical function, and the intermediate relation. In this embodiment, the method also includes placing a join operator that joins the intermediate relation with an output of the replacement operator.

25 Claims, 8 Drawing Sheets

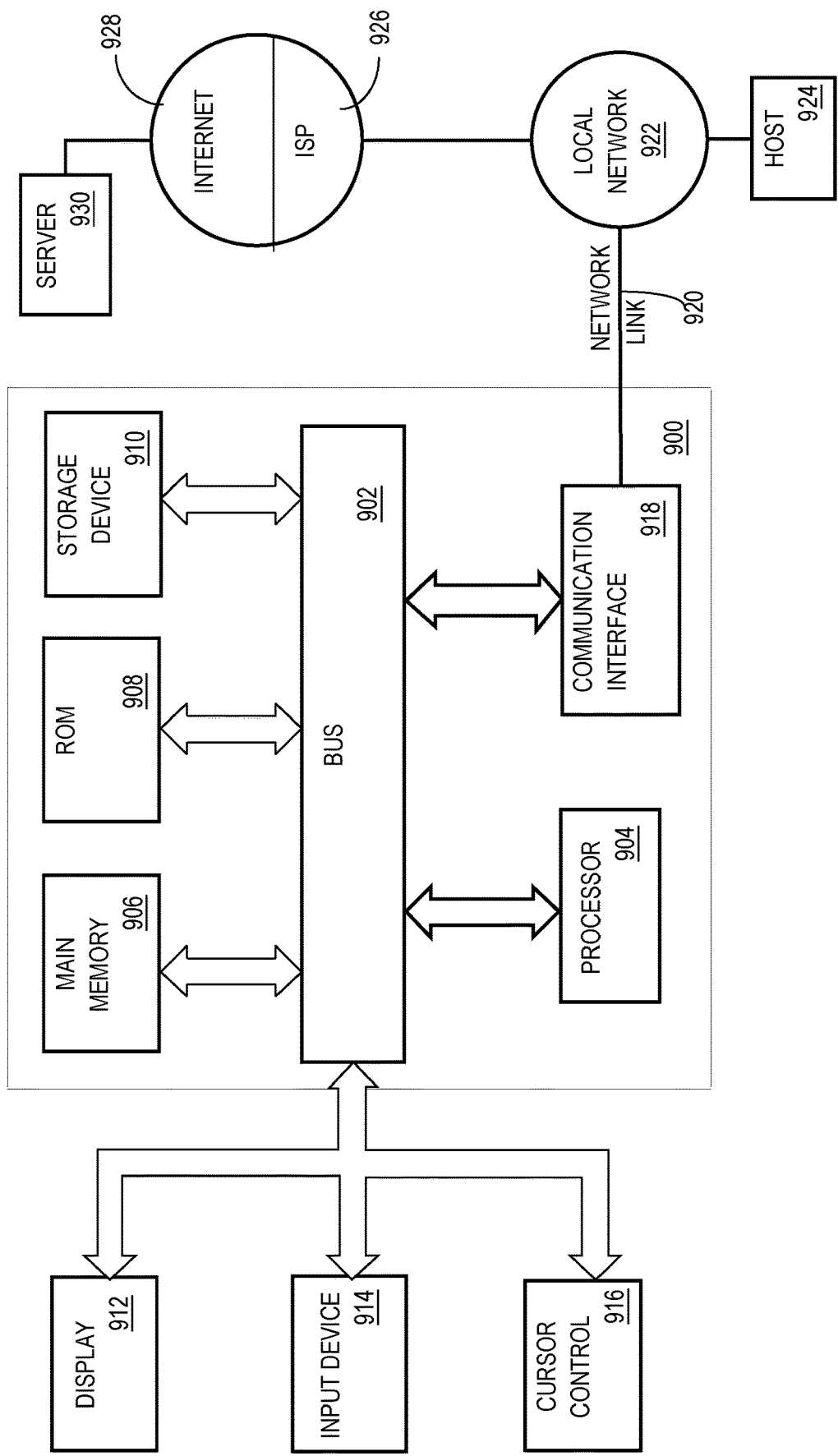

DRIVING MASSIVE SCALE OUT THROUGH REWRITES OF ANALYTICAL FUNCTIONS

FIELD OF THE TECHNOLOGY

The present disclosure relates to the field of database systems, and in particular to rewrite techniques for analytical functions in queries. For instance, the disclosed rewrite techniques transform a query including a nested subquery or a window function operator into a rewritten query including a group by or pure aggregation operator, and a join or cartesian product operator.

BACKGROUND

A database management system (DBMS) is configured to execute an expression, command, or set of commands, otherwise referred to as a query, to perform operation(s) on a set of data. The operations may select, group, order, filter, or otherwise process the data, and the processed data may be returned as part of a result set. One prevalent query language used by DBMSs to execute queries is structured query language ("SQL"), although numerous other query languages also exist.

Current DBMSs process complex SQL queries involving nested subqueries. Generally, subqueries are a powerful component that extend SQL's declarative and expressive capabilities. Such queries are useful in On-Line Analytical Processing (OLAP), for instance. The TPC is a non-profit corporation founded to define transaction processing and database benchmarks, and has developed and published specifications including decision support benchmarks, such as TPC-H. Almost half of the 22 queries in the TPC-H benchmark contain subqueries (see TPC Benchmark™ H, Standard Specification Revision 2.18.0). Most such subqueries are correlated and many contain analytical functions, such as ave and max.

Modern DBMSs like the Oracle relational database management system (RDBMS) employ query rewrite or transformation techniques to yield better query execution plans (QEP). A family of query rewrite techniques involves the area of subquery unnesting. Evaluation or execution of a query with a nested subquery can be very expensive and a QEP with an unnested subquery can be executed order of magnitudes faster than a QEP with a nested subquery. An optimizer of a DBMS may use subquery unnesting techniques that employ a window function operator as an alternative to the execution of a nested subquery. Unnesting techniques include, among others, correlated subsumed subquery rewrites and subsumed subquery in having clause rewrites, as discussed, for instance, in an article titled "Enhanced Subquery Optimizations in Oracle" by Bellamkonda et al. and published in the VLDB Journal '09.

The use of a window function operator, however, may be implemented as a sort-based operator that does not scale well and may cause performance issues in massively parallel database environments. This may especially be true if cardinality estimates are wrong because an independence assumption between database columns does not hold. For instance, if there are correlated columns and there is skew, then join estimates can be orders of magnitude off, which causes the cardinality of intermediate result sizes to be very different from its estimates. In such a setting a sort operation in a distributed system can be problematic, in particular if the sort is applied after multiple intermediate results have already been produced. This is because a range partitioning step is likely not able to distribute the work evenly.

Further, some offload engines and DBMSs might not even provide a window function operator, in which case the subquery unnesting techniques that employ a window function operator may not be an alternative.

Described herein are rewrite or transformation techniques for executing nested subqueries and window function operators more efficiently and by a wider variety of DBMSs.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 9 depicts a computer system upon which an embodiment may be implemented according to an embodiment.

DETAILED DESCRIPTION

Figure 1:
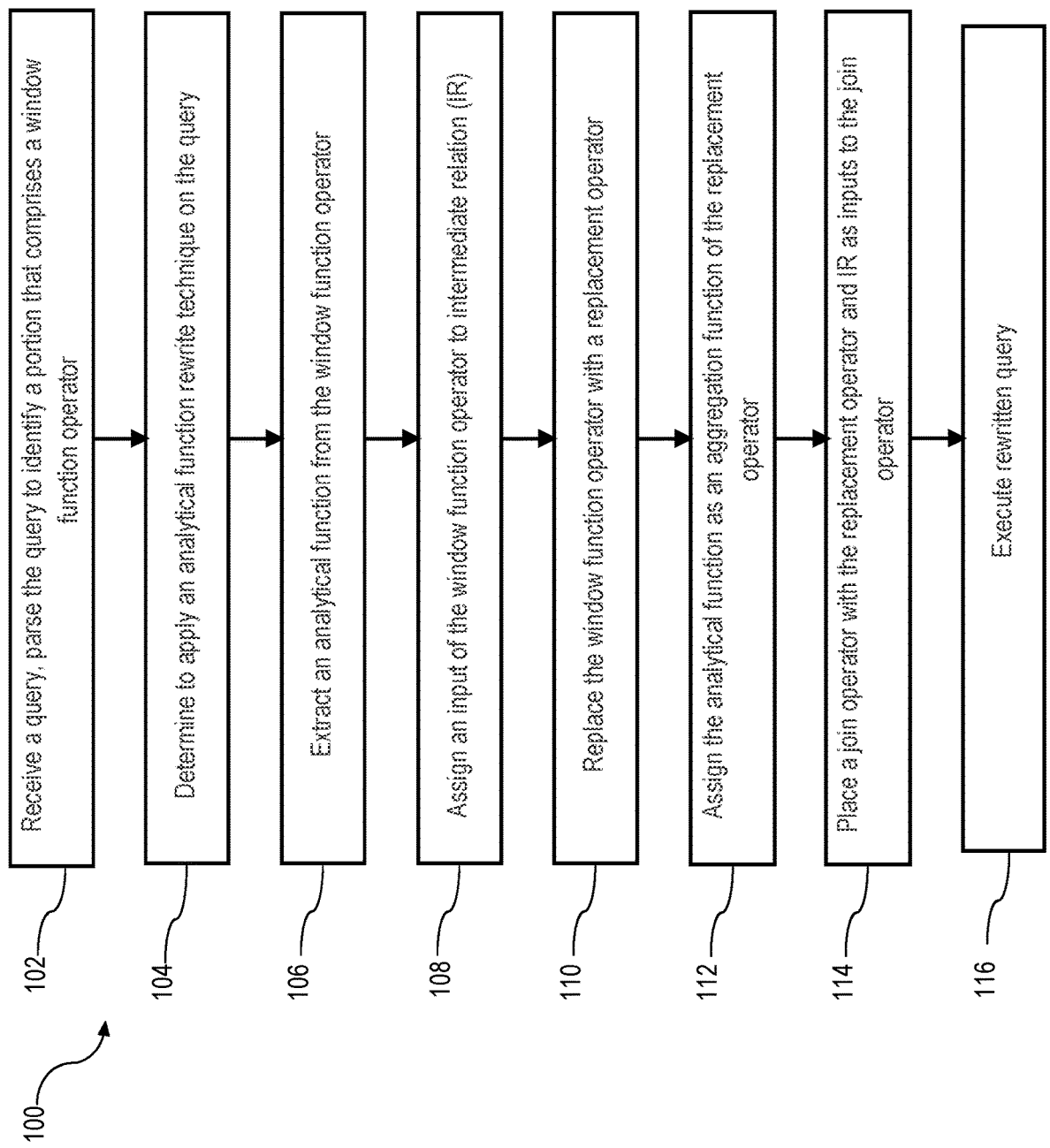
FIG. 1 is a flowchart depicting an analytical function rewrite technique according to an embodiment.

In the following description, for the purposes of explanation, numerous specific details are set forth in order to provide a thorough understanding of the present disclosure. The present disclosure, however, may be practiced without each of these specific details and/or in various different combinations.

General Overview

The present disclosure introduces rewrite techniques that transform a query including an analytical function corresponding, for instance, to a window function operator and/or an underlying nested subquery, into a rewritten query including a group by or pure aggregation operator, and a join or cartesian product operator. Such analytical function rewrite techniques help to avoid or minimize query execution challenges encountered when executing window function operators and nested subqueries. For group by and join operators, hash-based implementations are widely available, scale well, can be rearranged, and provide performance improvements over sort-based analytical function operators. Pure aggregation and cartesian product operators are straightforward to implement efficiently with or without hash-based implementations. For instance, an aggregation can be implemented efficiently through aggregation function decomposition. Consequently, the disclosed analytical function rewrite techniques provide robust strategies that help to provide the benefit of better scaling, which can significantly speed-up query processing and database performance.

Query Optimization Overview

In query optimization, a query rewrite technique may rewrite a representation of a query from one form to another form as long as the two forms are semantically equivalent to each other. The representation of the query may be the query expression or code itself or may be an internally and/or externally recognized representation of the query, such as a query execution tree or other data structure. If the representation does not include the query expression itself, the representation may include data that describes processes that may be performed to execute the query, such as an execution plan. An execution plan is a set of directives and metadata that is prepared for an execution engine. As used herein, a query representation is "rewritten" when (a) the representation represents a rewritten version of the query, after the query has been rewritten from a first version to a second version, (b) the representation is received in a manner that specifies a first set of operations, such as a first version or a first rewrite technique, and executed or caused to be executed using a second set of operations, such as the operations specified by a second version or second rewrite technique, or (c) received in a manner that specifies a first set of operations, and planned for execution using a second set of operations.

Two representations of queries are semantically equivalent to each other when the two representations of queries, if executed, would produce equivalent result sets, even if the result sets are assembled in different manners by the two representations. Execution of a representation of a query is semantically equivalent to the representation of the query if the execution produces a result set that is equivalent to the one that would be produced by the representation of the query, if executed.

The analytical function rewrite techniques of the present disclosure may be integrated into a cost-based optimizer, a transformation-based query optimizer, or a generative query optimizer. For instance, the analytical function rewrite techniques may be applied as a query language code rewrite after a subquery unnesting rewrite is performed, and/or the techniques may be applied at a QEP generation and optimization phase, in which existing window function operators that fit into analytical rewrite constraints discussed herein are replaced. Applying the analytical function rewrite techniques on the query code may be beneficial in some cases to enable other transformations, such as where a join ordering may push a join operator into a rewrite pattern, which results in the overall QEP being cheaper to execute.

Analytical Function Rewrite Techniques

Analytical function rewrite techniques disclosed herein include an analytical function rewrite for an empty partition by clause, which may be used to improve upon subsumed subquery in having clause rewrites, and an analytical function rewrite for a non-empty partition by clause, which may be used to improve upon correlated subsumed subquery rewrites. According to example embodiments, the analytical function rewrite for an empty partition by clause includes a pure aggregation with a cartesian product (see FIG. 1), and the analytical function rewrite for a non-empty partition by clause includes a group by and a join, which is performed on partition by keys (see FIG. 2).

Various commercial database systems, including the Oracle database, provide a window function implementation that includes an underlying sort operation. The analytical function rewrite techniques in the present disclosure are of value, for instance, in settings where query execution may be distributed to many processing nodes. To achieve an evenly distributed workload for sorting, a DBMS may use a preceding range partitioning technique with near optimal value boundaries, in which very fine grained and accurate statistics are needed. However, such statistics may need to be derived from base table statistics through many levels of intermediate results, which can be very cumbersome, or even not practically possible.

For better scale-out, those type of analytical functions should rather not be evaluated through a sort-based algorithm. And, instead of implementing a special operator, the disclosed analytical function rewrite techniques exploit existing, more common, and already well-tuned and refined operators like group by and join operators. Furthermore, some offload engines and DBMSs might not even provide a window function operator, and in such cases, the here proposed analytical function rewrite techniques may be the only suitable alternative.

Analytical Function Rewrite for an Empty Partition By Clause

FIG. 1 is a flowchart 100 depicting an analytical function rewrite technique according to an embodiment. At block 102, a DBMS (or, more particularly, an optimizer or rewrite component of the DBMS) receives a query and parses the query to identify at least a portion of the query that comprises an analytical function or operator to be evaluated or executed. According to an embodiment, the DBMS determines whether the query includes a window function operator to be evaluated or executed. At block 104, the DBMS makes a determination to apply an analytical function rewrite technique on the received query.

Generally, evaluation of a window function operator is based on three orthogonal concepts: partitioning, ordering, and framing. Under the concept of partitioning, semantics of a partition by operator is to partition an input by one or more expressions into independent groups. In contrast to a relational group by operator, a window function operator does not reduce all tuples of one group to a single tuple. Instead, the window function operator groups tuples into distinct partitions. If no partitioning clause is specified, all input rows are considered as belonging to the same partition. Under the concept of ordering, within each partition, an evaluation order of tuples is determined by an order by clause. Under the concept of framing, a framing clause further restricts the tuples a window function operator processes for a specified frame.

According to one embodiment, at blocks 102 and 104, the DBMS parses the query to identify the window function operator and determine whether the window function operator includes an order by clause and a framing clause. If the window function operator does not employ framing and has no order by clause, then no sorting operation is needed, which facilitates the analytical function rewrite techniques disclosed herein. In the embodiment of FIG. 1, the window function further includes no partition by clause or an over clause is empty, and so a hash-based algorithm may not even be needed. In this case, at block 104, the DBMS determines or decides to apply the analytical function rewrite for an empty partition by clause. As will be discussed hereinafter, if the window function includes no framing and has no order by clause, but includes a partition by clause, then the analytical function rewrite technique of FIG. 2 may be used to evaluate the query on the basis of hash-partitioning processes or operators.

In the embodiment of FIG. 1, the DBMS applies the analytical function rewrite technique according to blocks 106-114. Generally, the analytical function rewrite technique of FIG. 1 maps, for a window function operator that does not employ an order by clause, an analytical function from the window function operator to an aggregation function counterpart, and applies the corresponding aggregation function towards a group by or a pure aggregation operator. This transformation alone, however, can lead to a reduction in the number of output tuples. An OLAP function, such as a window function, differs in the cardinality of the output from a group by or a pure aggregation function or operator. Group by and pure aggregation functions either reduce the number of result tuples to the number of groupings (with one result tuple per group) or to a single tuple (because all tuples fall into the same grouping). In contrast, a window function maintains the number of tuples, but assigns the function result of the grouping to each result tuple that falls into the grouping.

Accordingly, a reduction in the number of output tuples could result in lost information carried in other attributes of the tuple that might be distinct to each input tuple, and therefore cannot be reduced into one result tuple per grouping. The following example helps to facilitate this understanding. Table 1 presents example code for an OLAP function with no order by clause, but that does include a partition by clause.

TABLE 1

SELECT ename , job , deptno , sal ,
    Avg (sal) over ( PARTITION BY deptno ) as avg_sal
FROM emp The OLAP function of Table 1 computes the average salary per department from an emp or employee table. An example emp table is provided in Table 2.

TABLE 2

| ename | job | deptno | sal |
|---|---|---|---|
| SMITH | CLERK | 20 | 800 |
| ALLEN | SALESMAN | 30 | 1600 |
| WARD | SALESMAN | 30 | 1250 |
| JONES | MANAGER | 20 | 2975 |
| MARTIN | SALESMAN | 30 | 1250 |
| BLAKE | MANAGER | 30 | 2850 |
| CLARK | MANAGER | 10 | 2450 |
| SCOTT | ANALYST | 20 | 3000 |
| KING | PRESIDENT | 10 | 5000 |
| TURNER | SALESMAN | 30 | 1500 |
| ADAMS | CLERK | 20 | 1100 |
| JAMES | CLERK | 30 | 950 |
| FORD | ANALYST | 20 | 3000 |
| MILLER | CLERK | 10 | 1300 |

Table 3 shows a result of executing the OLAP function of Table 1 on the emp table of Table 2.

TABLE 3

| ename | job | deptno | sal | avg |
|---|---|---|---|---|
| CLARK | MANAGER | 10 | 2450 | 2916.67 |
| KING | PRESIDENT | 10 | 5000 | 2916.67 |
| MILLER | CLERK | 10 | 1300 | 2916.67 |
| JONES | MANAGER | 20 | 2975 | 2175 |
| FORD | ANALYST | 20 | 3000 | 2175 |
| ADAMS | CLERK | 20 | 1100 | 2175 |
| SMITH | CLERK | 20 | 800 | 2175 |

TABLE 3-continued

| ename | job | deptno | sal | avg |
|---|---|---|---|---|
| SCOTT | ANALYST | 20 | 3000 | 2175 |
| WARD | SALESMAN | 30 | 1250 | 1566.67 |
| TURNER | SALESMAN | 30 | 1500 | 1566.67 |
| ALLEN | SALESMAN | 30 | 1600 | 1566.67 |
| JAMES | CLERK | 30 | 950 | 1566.67 |
| BLAKE | MANAGER | 30 | 2850 | 1566.67 |
| MARTIN | SALESMAN | 30 | 1250 | 1566.67 |

As can be seen in Table 3, using the OLAP function maintains the ename, job, and sal attributes.

In contrast, Table 4 presents example code for a group by function using only grouping attributes and the result of an aggregation function in result tuples.

TABLE 4

SELECT deptno , avg ( sal )
FROM emp
GROUP BY dept no

The group by function of Table 4 also computes average salary per department. Table 5 shows a result of executing the group by function of Table 4 on the emp table of Table 2.

TABLE 5

| 10 | 2916.67 |
|---|---|
| 20 | 2175 |
| 30 | 1566.67 |

As can be seen in Table 5, the ename, job, and sal attributes are not carried over into the result, since the number of groupings would be different and hence the result of the aggregation would be different. Considering the data for deptno=10, there are three employees in that group, however, if the group by function further grouped by the ename, job, and sal attributes, the result would include three groups instead of the desired one group for deptno=10, and the average salary per department would not be calculated as desired.

The analytical function rewrite techniques disclosed herein replace the analytical, OLAP, or window function with a group by on the partition by attributes or pure aggregation function, and regain lost attributes by joining results of the group by or pure aggregation function with an intermediate result or relation identified before applying the group by or pure aggregation function. In the case of the group by function, the group by attributes include the partition by attributes, the intermediate result or relation include, in addition to partition by attributes, the lost attributes, and the join joins by the partition by attributes.

Referring back to FIG. 1, at block 106, the DBMS extracts an analytical function from the window function operator, and the DBMS may further store the extracted analytical function for later use. For instance, the DBMS may store the extracted function as a counterpart aggregation function operator (agg). At block 108, the DBMS assigns an input to the window function operator as an intermediate result or relation (IR). According to an embodiment, the window function operator is configured to execute the analytical function on the input. According to an embodiment, the analytical functions may include a wide variety of functions, such as sum, min, count, average, rank, and others to compute values from the input or otherwise operate on the input, and the input may include data in a database structure.

At block 110, the DBMS rewrites the query by replacing the window function operator with a replacement operator, which can be a pure aggregation operator or a group by operator, for instance. In the present embodiment, the replacement operator may be a pure aggregation operator. At block 112, the DBMS assigns the extracted analytical function (agg) as an aggregation function. According to an embodiment, the replacement operator is configured to execute the aggregate function on an input. The DBMS may also denote the pure aggregation operator with a placeholder (ag) at block 110 or block 112. At block 114, the DBMS rewrites the query by placing a join operator with the replacement operator and IR as inputs to the join operator. At block 116, the DBMS may execute the rewritten query on a dataset to obtain a result.

In the embodiment of FIG. 1 where the window function includes an empty partition by clause, a pure aggregation operator is introduced as a counterpart of the window function in the original query. A pure aggregation operator computes the aggregation for a given attribute over all data or input tuples and does not require grouping of data or tuples. A pure aggregation can be considered as a group by clause with a single grouping that accordingly reduces the number of tuples to one, i.e., every input tuple falls into the same group, and a result of the pure aggregation operator is only one row. Consequently, the join operator introduced at block 114 is actually a join without a predicate or join attributes, which is equivalent to a join where the predicate always evaluates to true, and which is also equivalent to a cartesian product. One input to the cartesian product is the result of the pure aggregation operator, which consists of just one tuple, and so the cartesian product will not even be expanding. This is the desired result to retain the cardinality of IR, which is the other input to the cartesian product.

Figure 2:
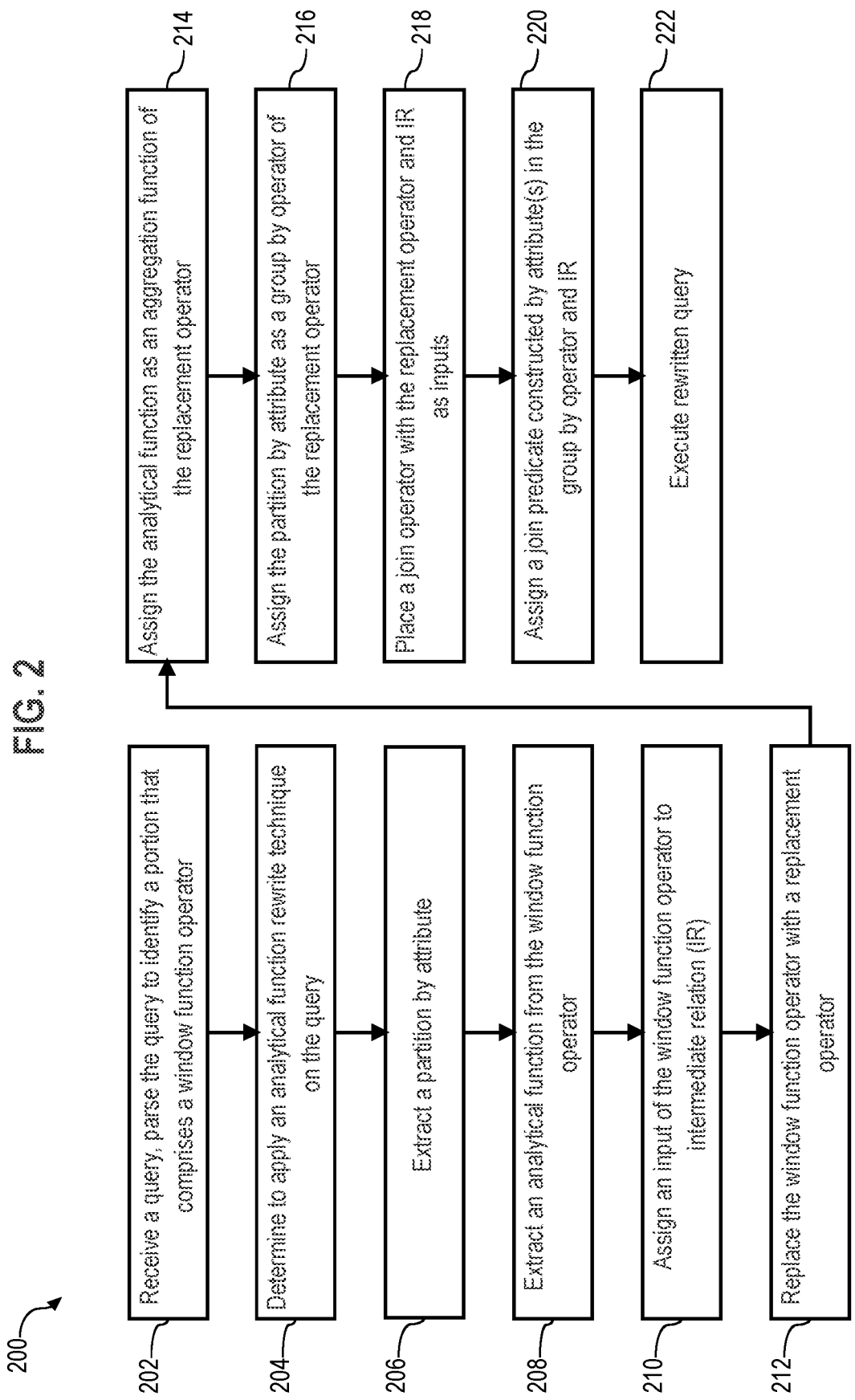
FIG. 2 is a flowchart depicting an analytical function rewrite technique according to another embodiment.
Figure 3:
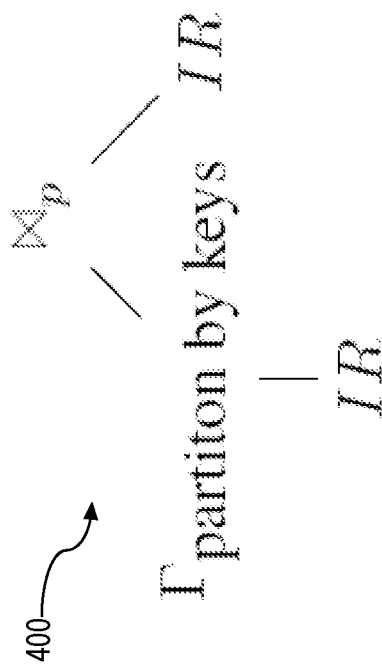
FIG. 3 illustrates a rewrite pattern of an analytical function rewrite for an empty partition by clause according to an embodiment of FIG. 1.
Figure 4:
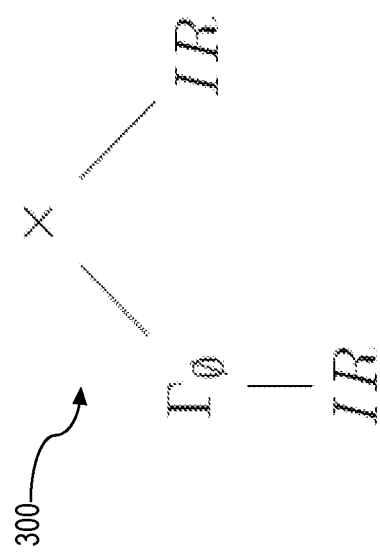
FIG. 4 illustrates a rewrite pattern of an analytical function rewrite for a non-empty partition by clause according to an embodiment of FIG. 2.

FIG. 3 illustrates a rewrite pattern of an analytical function rewrite for an empty partition by clause according to an embodiment of FIG. 1. As will be discussed in more detail hereinafter, FIG. 4 illustrates a rewrite pattern of an analytical function rewrite for a non-empty partition by clause according to an embodiment of FIG. 2. In FIG. 3, IR denotes the intermediate relation that is input to the window function operator of the original query. A group by operator represented by $\Gamma$ is substituted for the window function operator in the original query, and the analytical function of the original query is mapped to the corresponding aggregation function of the group by operator. No partition by keys are present in the original window function operator, so the group by operator is equivalent to a pure aggregation operator represented by $\Gamma\emptyset$. In FIG. 3, a join or cartesian product represented by x is placed above the pure aggregation operator. One input to the join is the pure aggregation operator and another input to the join is IR. FIG. 3 depicts the rewrite pattern as a tree. If the DBMS supports direct acyclic graphs (DAGs), then both the pure aggregation and join operators will share the same input IR. If the query engine architecture of the DBMS does not support result sharing, IR can be materialized as a temporary result, and both the pure aggregation and join operators will read from the materialized temporary result IR.

The analytical function rewrite for an empty partition by clause is further illustrated by applying the technique to the subsumed subquery in having clause rewrites discussed, for instance, in "Enhanced Subquery Optimizations in Oracle" by Bellamkonda et al. For instance, the following example relates to the subquery unnesting techniques applied to rewrite TPC-H queries Q11, as discussed in Bellamkonda. Applying the present analytical function rewrite techniques to the rewritten TPC-H query Q11, results in the example code of Table 6. In this example code, an input to the window function operator is denoted with IR, and a result of the pure aggregation is denoted with AG. The cartesian product is applied in the subquery V, by having IR and AG in the FROM clause without giving a join predicate in the where clause.

TABLE 6

```
WITH IR
    AS (SELECT ps_partkey ,
            SUM ( Ps_supplycost * Ps_availqty ) AS value
        FROM   partsupp ,
            supplier ,
            nation
        WHERE  ps_suppkey = s_suppkey
            AND s_nationkey = n_nationkey
            AND n_name = 'FRANCE'
        GROUP BY ps_partkey ) ,
    AG
    AS (SELECT SUM ( value ) AS agg
        FROM IR)
SELECT V.ps_partkey ,
    V.value
FROM (SELECT    ir.ps_partkey ,
            ir1.value ,
            agg AS gt_value
      FROM   IR ,
            AG ) V
WHERE V.value > V.gt_value * 0.0001
```

Figure 5:
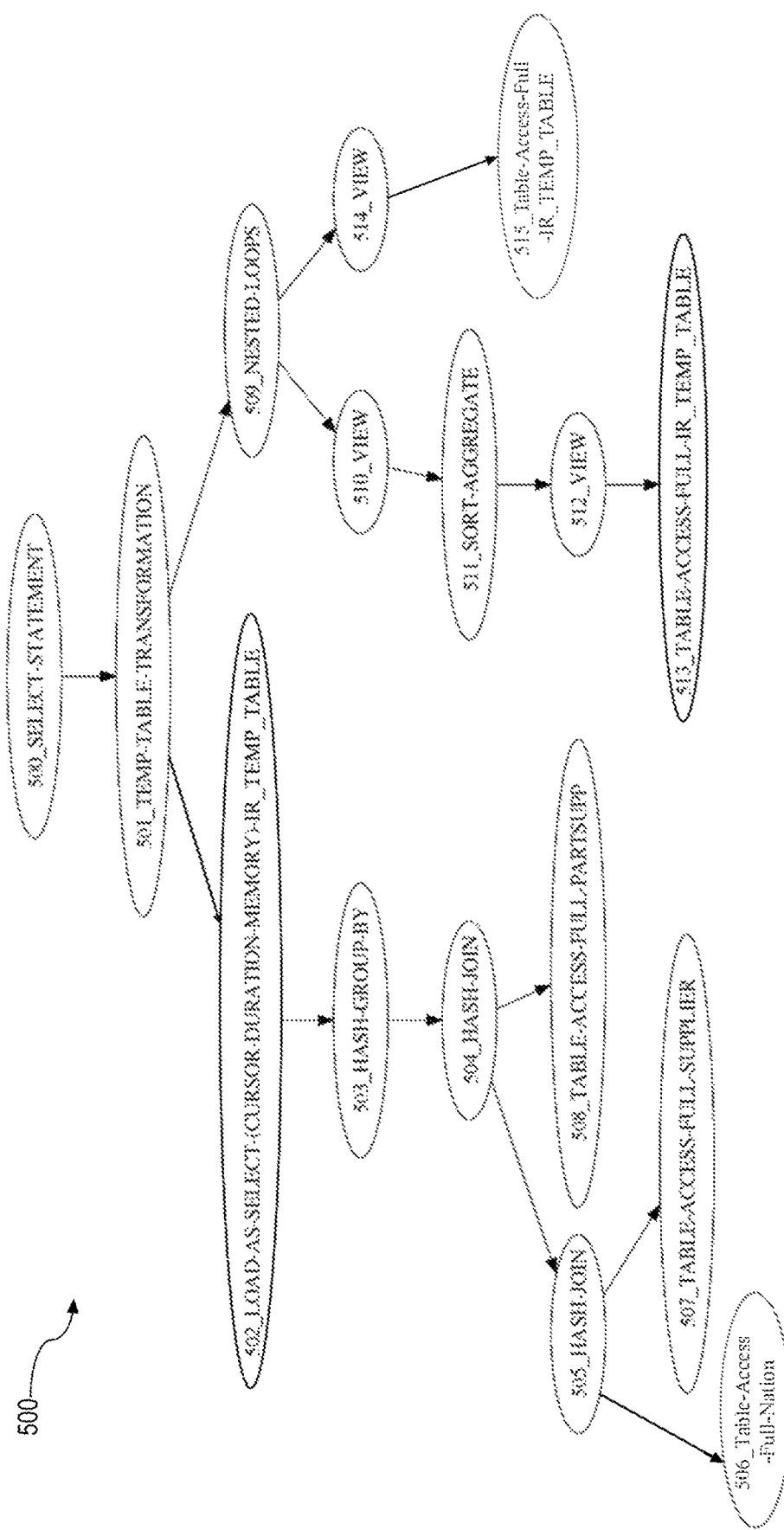
FIG. 5 illustrates a tree-representation of a QEP after applying an analytical function rewrite technique to the rewritten TPC-H query Q11.

FIG. 5 illustrates a tree-representation 500 of a query execution plan (QEP) after applying the analytical function rewrite techniques to the rewritten TPC-H query Q1. A join or cartesian product operator 509 substitutes for a previously used window function operator. A load operator 502 materializes the intermediate relation IR. The rewrite pattern of FIG. 3 can be observed in the reading of IR twice. More particularly, IR is read first at table-access operator 513, which is an input to a pure aggregation operator 511. IR is read again at table-access operator 515, which is an input to the join operator 509. View operators 510, 512, and 514 may be ignored as no-ops to make more apparent the rewrite pattern of FIG. 3.

Analytical Function Rewrite for a Non-Empty Partition By Clause

FIG. 2 is a flowchart 200 depicting an analytical function rewrite technique according to an embodiment. The flowchart 200 is similar to the flowchart 100 in various ways. Differences between the flowcharts 200, 100 will be discussed in more detail hereinafter. At block 202, a DBMS (or, more particularly, an optimizer or rewrite component of the DBMS) receives a query and parses the query to identify at least a portion of the query that comprises an analytical function or operator to be evaluated or executed. According to an embodiment, the DBMS determines whether the query includes a window function operator to be evaluated or executed. At block 204, the DBMS makes a determination to apply an analytical function rewrite technique on the received query.

According to one embodiment, at blocks 202 and 204, the DBMS parses the query to identify the window function operator and determine that the window function operator does not include an order by clause or a framing clause, but does include a partition by clause. In this case, at block 204, the DBMS determines or decides to apply the analytical function rewrite for a non-empty partition by clause.

In the embodiment of FIG. 2, the DBMS applies the analytical function rewrite technique according to blocks 206-220. At block 206, the DBMS extracts a partition by attribute or attributes from the window function operator, and the DBMS may further store the partition by attribute for later use. For instance, the DBMS may store the extracted partition by attribute under a placeholder A. At block 208, the DBMS extracts an analytical function from the window function operator, and the DBMS may further store the extracted analytical function for later use. For instance, the DBMS may store the extracted function as a counterpart aggregation function operator (agg). At block 210, the DBMS assigns an input to the window function operator as an intermediate result or relation (IR).

At block 212, the DBMS rewrites the query by replacing the window function operator with a replacement operator. In the present embodiment, the replacement operator is a group by operator. At block 214, the DBMS assigns the extracted analytical function (agg) as an aggregation function to be executed by the replacement operator. At block 214, the DBMS assigns the extracted partition by attribute (A) as a group by operator of the replacement operator. The DBMS may also denote the group by operator with a placeholder (GBY) at block 212, 214, or 216.

At block 218, the DBMS rewrites the query by placing a join operator with the replacement operator and IR as inputs to the join operator. At block 220, the DBMS assigns a join predicate or join attribute(s) constructed by attribute(s) in the group by operator and IR. According to one embodiment, the join predicate is constructed using attributes of the partition by clause as follows: for each attribute (a) in (A) define a sub-predicate as IR.a=GBY.a, and if A>1, then there is more than one sub-predicate and each sub-predicate is concatenated together. In other words, the join predicate is constructed by matching each of one or more partition by attributes between the input of the window function operator and the group by operator. At block 222, the DBMS may execute the rewritten query on a dataset to obtain a result.

FIG. 4 illustrates a rewrite pattern 400 of the analytical function rewrite for a non-empty partition by clause. In FIG. 4, IR denotes the intermediate relation that is input to the window function operator. A group by operator represented by Γ is substituted for the window function operator in the original query, and the analytical function of the original query is mapped to the corresponding aggregation function of the group by operator. FIG. 4 illustrates that "partition by keys" of the window function operator in the original query are assigned as grouping attributes of the group by operator, which is represented by $\Gamma_{partition\ by\ keys}$. In FIG. 4, a join represented by $\bowtie_p$ is placed above the group by operator. One join input is the group by operator and another join input is IR. FIG. 4 depicts the rewrite pattern as a tree. The join predicate p is constructed as discussed above, for instance. If the DBMS supports direct acyclic graphs (DAGs), then both the group by and join operators will share the same input IR. If the query engine architecture of the DBMS does not support result sharing, IR can be materialized as a temporary result, and both the group by and join operators will read from the materialized temporary result IR.

Applying the analytical function rewrite techniques to the function of Table 1 results in the example code of Table 7.

TABLE 7

WITH IR
   AS (SELECT ename ,
         job ,
         deptno ,
         sal
     FROM  emp ) ,
   AG
   AS (SELECT avg(sal) AS agg
     FROM  IR) ,
SELECT ename ,
   job ,
   depno ,
   sal ,
   agg as avg_sal
   FROM IR ,
     AG As shown in Table 7, two table expressions that are equivalent to with clauses are specified—IR and AG. IR is the intermediate result or relation that was the input to the window function operator. AG is the result of average function operating on IR. Both IR and AG are taken as inputs to the join operator and together function to substitute for the window function operator.

The analytical function rewrite for a non-empty partition by clause is further illustrated by applying the technique to the correlated subsumed subquery rewrites discussed, for instance, in "Enhanced Subquery Optimizations in Oracle" by Bellamkonda et al. For instance, the following examples relate to the subquery unnesting techniques applied to rewrite TPC-H queries Q2 and Q17, as discussed in Bellamkonda. Applying the present analytical function rewrite techniques to the rewritten TPC-H query Q2, results in the example code of Table 8. As shown in Table 8, two table expressions that are equivalent to with clauses are specified—IR and GBY. IR is the intermediate result or relation that was the input to the window function operator. GBY is the result of the group by. Both IR and GBY are taken as inputs to the join operator and together function to substitute for the window function operator.

TABLE 8

WITH IR
   AS (SELECT ps_supplycost ,
         s_name ,
         n_name ,
         ps_partkey ,
         p_partkey
     FROM  part ,
         supplier ,
         partsupp ,
         nation ,
         region
     WHERE p_partkey = ps_partkey
        AND s_suppkey = ps_suppkey
        AND s_nationkey = n_nationkey
        AND n_regionkey = r_regionkey
        AND p_size = 36
        AND r_name = 'ASIA' ) ,
GBY
   AS (SELECT ps_partkey ,
         Min ( ps_supplycost ) AS agg
     FROM  IR
     GROUP BY ps_partkey )
SELECT s_name ,
   n_name
   p_partkey
FROM  (SELECT  ps_supplycost ,
        gby.agg AS min_ps ,
        s_name ,
        n_name ,
        p_partkey TABLE 8-continued

```
              FROM IR,
                 GBY
            WHERE ir.ps_partkey = gby.ps_partkey ) V
            WHERE V . ps_supplycost = V . min_ps
```

Figure 6:
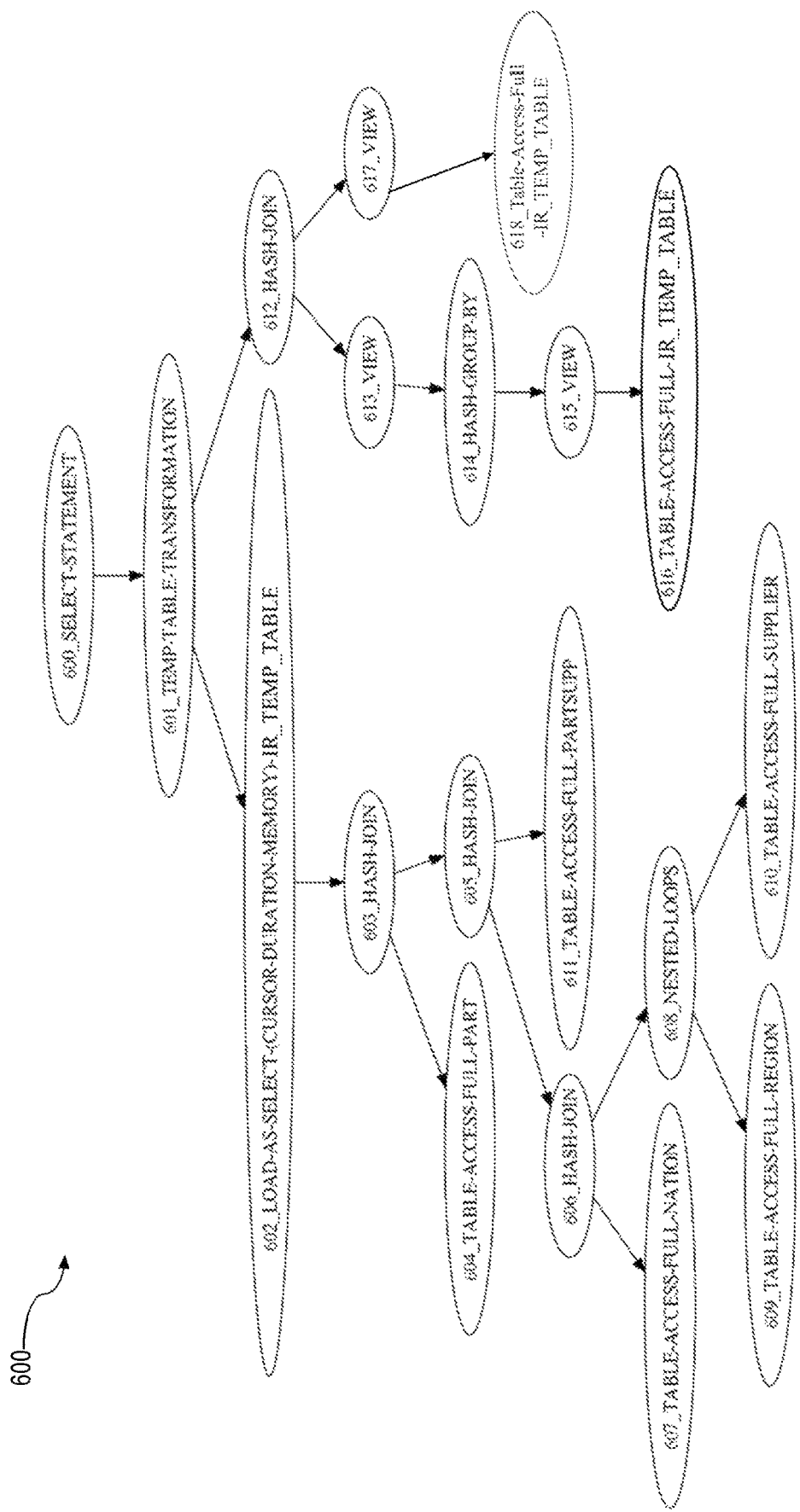
FIG. 6 illustrates a tree-representation of a QEP after applying an analytical function rewrite technique to the rewritten TPC-H query Q2.

FIG. 6 illustrates a tree-representation 600 of a query execution plan (QEP) after applying the analytical function rewrite techniques to the rewritten TPC-H query Q2. A join operator 612 substitutes for a previously used window function operator. A load operator 602 materializes the intermediate relation IR. More particularly, IR is materialized in this example by performing: nested-loops operator 608 on region table (table-access operator 609) and supplier table (table-access operator 610); hash-join operator 606 on nation table (table-access operator 607) and a result of nested-loops operator 608; hash-join operator 605 on part-supp table (table-access operator 611) and a result of hash-join operator 606; and hash-join operator 603 on part table (table-access operator 604) and a result of hash-join operator 605.

The rewrite pattern of FIG. 4 can be observed in the reading of IR twice. More particularly, IR is read first at table-access operator 616, which is an input to a group by operator 614. IR is read again at table-access operator 618, which is an input to a join operator 612. View operators 615, 617 may be ignored as no-ops to make more apparent the rewrite pattern of FIG. 4.

Applying the present analytical function rewrite techniques to the rewritten TPC-H query Q17, results in the example code of Table 9. Table 9 is similar to Table 8 discussed above, in that both tables include expressions for IR and GBY, and GBY and the join operator with IR substitute for the window function operator.

TABLE 9

```
WITH IR
    AS   (SELECT l_quantity ,
                 l_partkey ,
                 l_extendedprice
          FROM   lineitem ) ,
    GBY
    AS   (SELECT Avg ( l_quantity ) AS agg ,
                 l_partkey
          FROM   IR
          GROUP BY l_partkey )
SELECT SUM ( avg_extprice ) / 7.0 AS avg_yearly
FROM part ,
         (SELECT ( CASE
            WHEN ir.l_quantity < ( 1.2 * agg ) THEN
              ir.l_extendedprice
            ELSE NULL
            END ) avg_extprice ,
            ir.l_partkey
         FROM IR,
            GBY
         WHERE ir.l_partkey = gby.l_partkey ) V
WHERE p_partkey = V.l_partkey
    AND V.avg_extprice IS NOT NULL
    AND p_brand = 'Brand#23'
    AND p_container = 'MED BOX'
```

Figure 7:
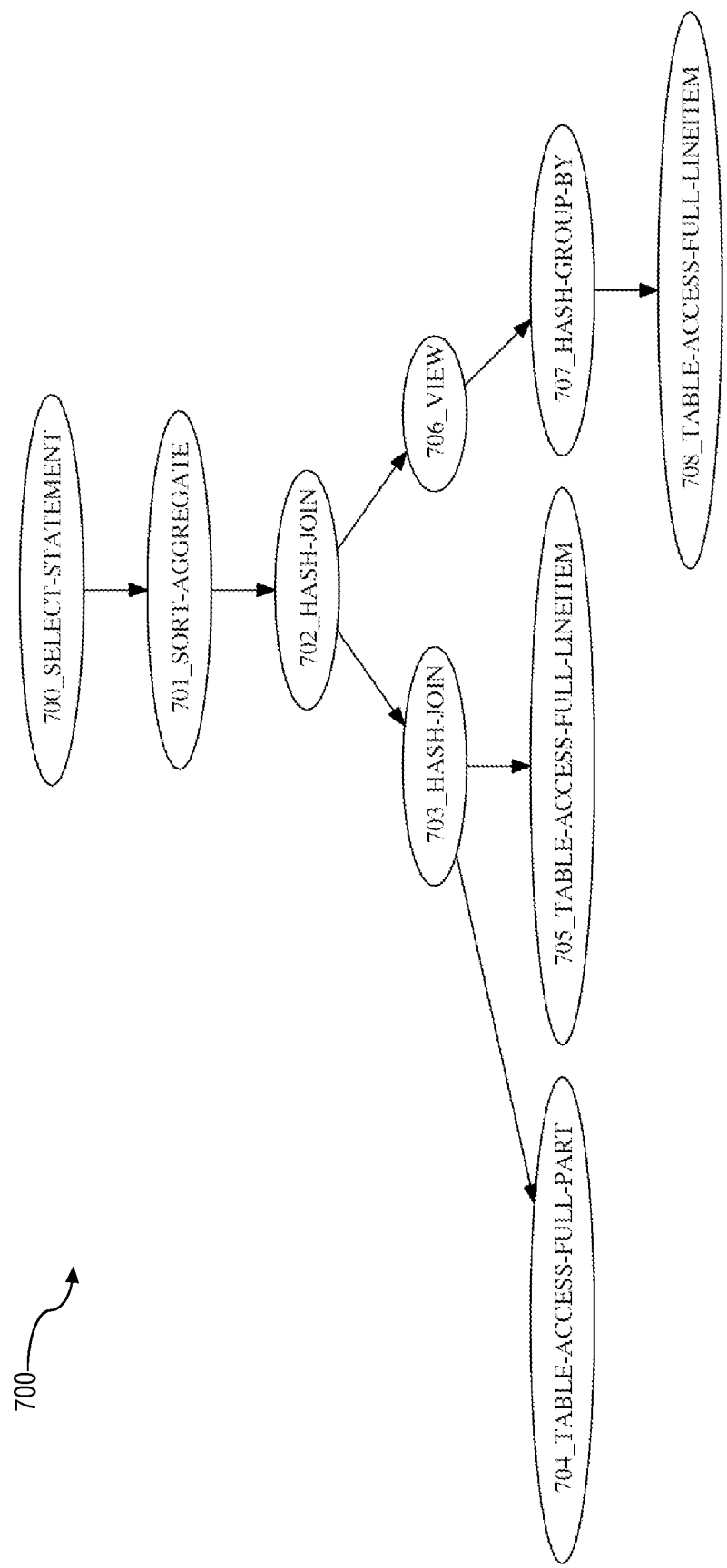
FIG. 7 illustrates a tree-representation of a QEP after applying an analytical function rewrite technique to the rewritten TPC-H query Q17.

FIG. 7 illustrates a tree-representation 700 of the QEP after applying the analytic function rewrite techniques to the rewritten TPC-H query Q 17. In this example, the rewrite pattern of FIG. 4 is depicted by operators 702, 705, 707, and 708. The intermediate relation IR is read twice as a scan of the table lineitem at table-access operators 705 and 708. The view operator 706 is a no-op and can be ignored to more clearly recognize the pattern of FIG. 4.

In FIG. 7, a join operator 703 and a table-access operator 704 are intermixed with the rewrite pattern, because after applying the analytical function rewrite, a query optimizer still has a choice in applying other transformations. In the present example, the optimizer has determined through cost and statistical analysis that it is beneficial to apply the join operator 703 on the part table (table-access operator 704) and the lineitem table (table-access operator 705), in order to reduce the "left" input to the join operator 702. Alternatively, the join operator 703 could be applied on top of the join operator 702, and with the join operator 703 and the table-access operator 704 as inputs.

Database Overview

Embodiments of the present invention are used in the context of database management systems (DBMSs). Therefore, a description of an example DBMS is provided.

Generally, a server, such as a database server, is a combination of integrated software components and an allocation of computational resources, such as memory, a node, and processors for executing the integrated software components, where the combination of the software and computational resources are dedicated to providing a particular type of function on behalf of clients of the server. A database server governs and facilitates access to a particular database, and processes requests by clients to access the database.

A database comprises data and metadata that is stored on a persistent memory mechanism, such as a set of hard disks. Such data and metadata may be stored in a database logically, for example, according to relational and/or object-relational database constructs.

Users interact with a database server of a DBMS by submitting to the database server commands that cause the database server to perform operations on data stored in a database. User interaction may be through one or more applications running on a client computer that interact with a database server. Multiple users may also be referred to herein collectively as a user.

A database command may be in the form of a database statement. For the database server to process the database statements, the database statements should conform to a database language supported by the database server. One example of a database language that is supported by many database servers is SQL, including proprietary forms of SQL supported by such database servers as Oracle, (e.g. Oracle Database 11g). SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

Generally, data is stored in a database in one or more data containers, each container contains records, and the data within each record is organized into one or more fields. In relational database systems, the data containers are typically referred to as tables, the records are referred to as rows, and the fields are referred to as columns. In object-oriented databases, the data containers are typically referred to as object classes, the records are referred to as objects, and the fields are referred to as attributes. Other database architectures may use other terminology. Systems that implement the present disclosure are not limited to any particular type of data container or database architecture. However, for the purpose of explanation, the examples and the terminology used herein shall be that typically associated with relational or object-relational databases. Thus, the terms table, row, and column shall be used herein to refer respectively to the data container, record, and field.

A multi-node database management system is made up of interconnected nodes that share access to the same database. Typically, the nodes are interconnected via a network and share access, in varying degrees, to shared storage, e.g., shared access to a set of disk drives and data blocks stored thereon. The nodes in a multi-node database system may be in the form of a group of computers (e.g., workstations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processors for executing the integrated software components, the combination of the software and computational resources being dedicated to performing a particular function on behalf of one or more clients.

Figure 8:
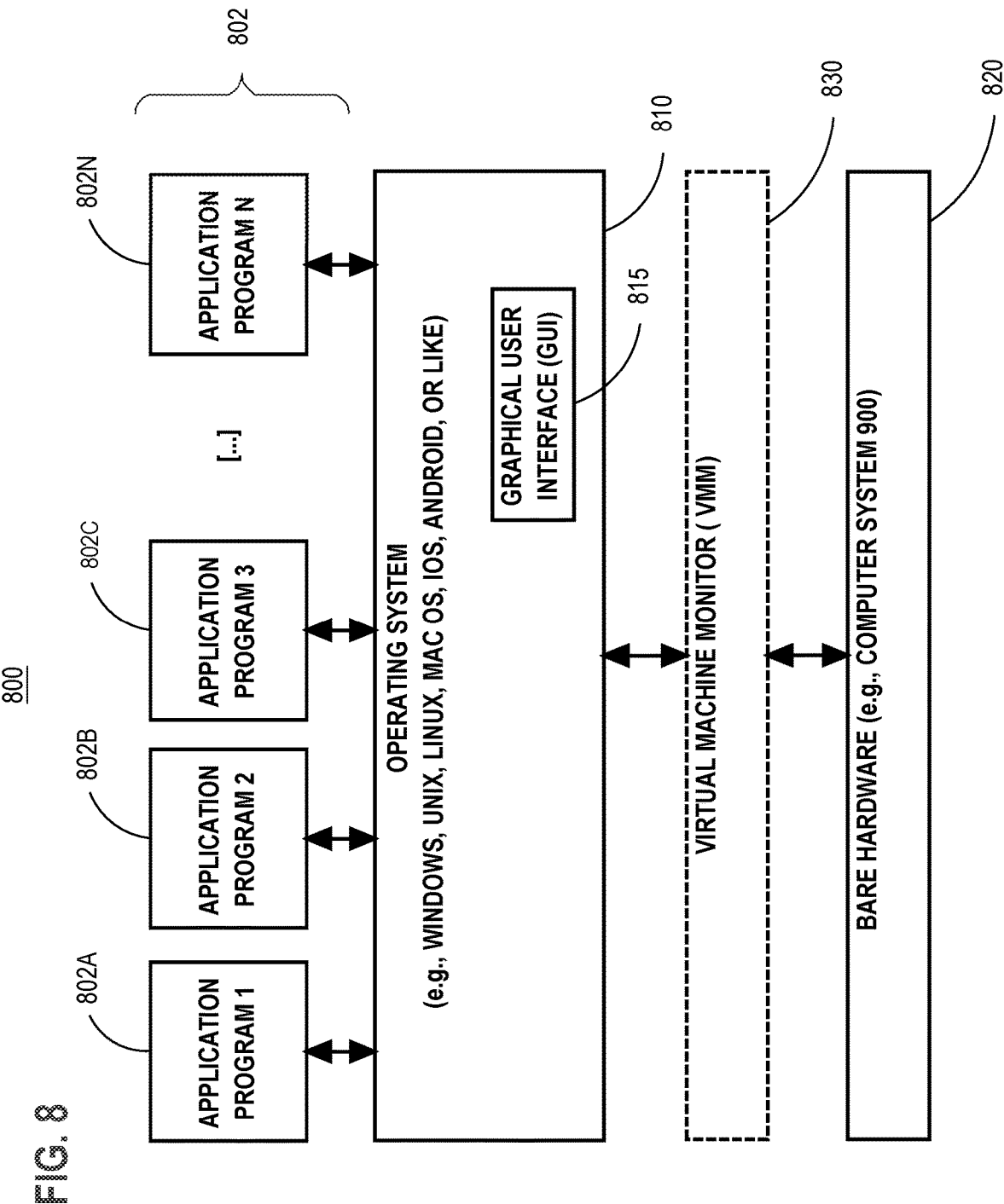
FIG. 8 is a block diagram of a basic software system that may be employed for controlling the operation of a computing system, such as a DBMS, according to an embodiment.

Resources from multiple nodes in a multi-node database system can be allocated to execute a particular database server's software. Each combination of the software and allocation of resources from a node may be referred to herein as a server, server instance, or instance. A database server may comprise multiple database instances, some or all of which are running on separate computers, including separate server blades Software Overview FIG. 8 is a block diagram of a basic software system 800 that may be employed for controlling the operation of a computing system, such as a computing system 900 of FIG. 9. Software system 800 and its components, including their connections, relationships, and functions, is meant to be illustrative and not meant to limit implementations of the example embodiment(s). Other software systems suitable for implementing the example embodiment(s) may have different components, including components with different connections, relationships, and functions.

Software system 800 is provided for directing the operation of computing system 900, which may be a DBMS or a component thereof. Software system 800, which may be stored in system memory (RAM) 906 and on fixed storage (e.g., hard disk or flash memory) 910, includes a kernel or operating system (OS) 810.

The OS 810 manages low-level aspects of computer operation, including managing execution of processes, memory allocation, file input and output (I/O), and device I/O. One or more application programs, represented as 802A, 802B, 802C . . . 802N, may be "loaded" (e.g., transferred from fixed storage 910 into memory 906) for execution by the system 800. The applications or other software intended for use on computer system 900 may also be stored as a set of downloadable computer-executable instructions, for example, for downloading and installation from an Internet location (e.g., a Web server, an app store, or other online service).

Software system 800 includes a graphical user interface (GUI) 815, for receiving user commands and data in a graphical (e.g., "point-and-click" or "touch gesture") fashion. These inputs, in turn, may be acted upon by the system 800 in accordance with instructions from operating system 810 and/or application(s) 802. The GUI 815 also serves to display the results of operation from the OS 810 and application(s) 802, whereupon the user may supply additional inputs or terminate the session (e.g., log off).

OS 810 can execute directly on the bare hardware 820 (e.g., processor(s) 904) of computer system 900. Alternatively, a hypervisor or virtual machine monitor (VMM) 830 may be interposed between the bare hardware 820 and the OS 810. In this configuration, VMM 830 acts as a software "cushion" or virtualization layer between the OS 810 and the bare hardware 820 of the computer system 900.

VMM 830 instantiates and runs one or more virtual machine instances ("guest machines"). Each guest machine comprises a "guest" operating system, such as OS 810, and one or more applications, such as application(s) 802, designed to execute on the guest operating system. The VMM 830 presents the guest operating systems with a virtual operating platform and manages the execution of the guest operating systems.

In some instances, the VMM 830 may allow a guest operating system to run as if it is running on the bare hardware 820 of computer system 900 directly. In these instances, the same version of the guest operating system configured to execute on the bare hardware 820 directly may also execute on VMM 830 without modification or reconfiguration. In other words, VMM 830 may provide full hardware and CPU virtualization to a guest operating system in some instances.

In other instances, a guest operating system may be specially designed or configured to execute on VMM 830 for efficiency. In these instances, the guest operating system is "aware" that it executes on a virtual machine monitor. In other words, VMM 830 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Multiple threads may run within a process. Each thread also comprises an allotment of hardware processing time but share access to the memory allotted to the process. The memory is used to store content of processors between the allotments when the thread is not running. The term thread may also be used to refer to a computer system process in multiple threads are not running.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

The herein-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general-purpose microprocessor.

Computer system 900 also includes a main memory 906, such as a random-access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic, or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the worldwide packet data communication network now commonly referred to as the "Internet" 928. Local network 922 and Internet 928 both use electrical, electromagnetic, or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

What is claimed is:

1. A method, comprising:
a DBMS (database management system) rewriting a particular query to generate a rewritten query, wherein the particular query specifies a window function operator, a particular input to the window function operator, one or more PARTITION BY attributes, and an analytical function, wherein rewriting the particular query includes:
assigning the particular input to an intermediate relation;
replacing the window function operator with a GROUP BY operator, and assigning to the GROUP BY operator:
the one or more PARTITION BY attributes as grouping attributes,
an aggregate function corresponding to the analytical function, and
the intermediate relation;
placing a join operator that joins the intermediate relation with an output of the GROUP BY operator, wherein the join operator includes the one or more PARTITION BY attributes as one or more join attributes; and
said DBMS executing said rewritten query.

2. The method of claim 1, wherein rewriting the particular query is performed in response to determining that the window function operator satisfies criteria, wherein the criteria include that the window function operator applies no framing, has no ORDER BY clause, and includes a PARTITION BY clause.

3. The method of claim 1, wherein the one or more join attributes are constructed by matching each of the one or more PARTITION BY attributes between the intermediate relation and the GROUP BY operator.

4. The method of claim 1, wherein the one or more join attributes are constructed by matching each of the one or more PARTITION BY attributes between the intermediate relation and the GROUP BY operator, and concatenating each of a plurality of join attributes together.

5. The method of claim 1, wherein the GROUP BY operator and the join operator share the intermediate relation as an input.

6. The method of claim 1, wherein the intermediate relation is materialized as a temporary result, and the GROUP BY operator and the join operator, when executed, read from the temporary result.

7. The method of claim 1, further comprising executing the rewritten query on a dataset to obtain a result.

8. A method, comprising:
a DBMS (database management system) rewriting a particular query to generate a rewritten query, wherein the particular query specifies a window function operator, a particular input to the window function operator, and an analytical function, wherein rewriting the particular query includes:
assigning the particular input to an intermediate relation;
replacing the window function operator with a pure aggregation operator and assigning to the pure aggregation operator:
an aggregate function corresponding to the analytical function, and
the intermediate relation;
placing a Cartesian product operator that operates on the intermediate relation and on an output of the pure aggregation operator; and
said DBMS executing said rewritten query.

9. The method of claim 8, wherein rewriting the particular query is performed in response to determining that the window function operator satisfies criteria, wherein the criteria include that the window function operator applies no framing, has no ORDER BY clause, and no PARTITION BY clause.

10. The method of claim 8, wherein rewriting the particular query is performed in response to determining that the window function operator satisfies criteria, wherein the criteria include that the window function operator applies no framing, has no ORDER BY clause, and an empty OVER clause.

11. The method of claim 8, wherein the Cartesian product operator is a join operator with empty join attributes.

12. The method of claim 8, wherein the pure aggregation operator is a GROUP BY operator with a single grouping.

13. The method of claim 8, wherein the pure aggregation operator and the Cartesian product operator share the intermediate relation as an input.

14. The method of claim 8, wherein the intermediate relation is materialized as a temporary result, and the pure aggregation operator and the Cartesian product operator, when executed, read from the temporary result.

15. The method of claim 8, further comprising executing the rewritten query on a dataset to obtain a result.

16. One or more non-transitory computer-readable storage medium storing instructions that, when executed by one or more processors, cause the one or more processors to perform functions comprising:
   a DBMS (database management system) rewriting a particular query to generate a rewritten query, wherein the particular query specifies a window function operator, a particular input to the window function operator, and an analytical function, wherein rewriting the particular query includes:
      assigning the particular input to an intermediate relation;
      replacing the window function operator with a replacement operator, and assigning to the replacement operator:
         an aggregate function corresponding to the analytical function, and
         the intermediate relation;
      placing a join operator that joins the intermediate relation with an output of the replacement operator;
   said DBMS executing said rewritten query.

17. The one or more non-transitory computer-readable storage medium of claim 16, wherein rewriting the particular query is performed in response to determining that the window function operator satisfies criteria, wherein the criteria include that the window function operator applies no framing, has no ORDER BY clause, and includes one or more PARTITION BY attributes.

18. The one or more non-transitory computer-readable storage medium of claim 17, wherein the replacement operator is a GROUP BY operator, and replacing the window function operator with the replacement operator further includes assigning to the GROUP BY operator the one or more PARTITION BY attributes as grouping attributes; and
   wherein the join operator includes the one or more PARTITION BY attributes as one or more join attributes.

19. The one or more non-transitory computer-readable storage medium of claim 16, wherein rewriting the particular query is performed in response to determining that the window function operator satisfies criteria, wherein the criteria include that the window function operator applies no framing, has no ORDER BY clause, and no PARTITION BY clause.

20. The one or more non-transitory computer-readable storage medium of claim 19, wherein the replacement operator is a pure aggregation operator and the join operator is a Cartesian product operator.

21. A method, comprising:
   a DBMS (database management system) rewriting a particular query to generate a rewritten query, wherein the particular query specifies a window function operator, a particular input to the window function operator, and an analytical function, wherein rewriting the particular query includes:
      assigning the particular input to an intermediate relation;
      replacing the window function operator with a replacement operator, and assigning to the replacement operator:
         an aggregate function corresponding to the analytical function, and the intermediate relation;
      placing a join operator that joins the intermediate relation with an output of the replacement operator;
   said DBMS executing said rewritten query.

22. The method of claim 21, wherein rewriting the particular query is performed in response to determining that the window function operator satisfies criteria, wherein the criteria include that the window function operator applies no framing, has no ORDER BY clause, and includes one or more PARTITION BY attributes.

23. The method of claim 22, wherein the replacement operator is a GROUP BY operator, and replacing the window function operator with the replacement operator further includes assigning to the GROUP BY operator the one or more PARTITION BY attributes as grouping attributes; and
   wherein the join operator includes the one or more PARTITION BY attributes as one or more join attributes.

24. The method of claim 21, wherein rewriting the particular query is performed in response to determining that the window function operator satisfies criteria, wherein the criteria include that the window function operator applies no framing, has no ORDER BY clause, and no PARTITION BY clause.

25. The method of claim 24, wherein the replacement operator is a pure aggregation operator and the join operator is a Cartesian product operator.

* * * * *